United States Patent
Huang et al.

(10) Patent No.: US 12,156,117 B1
(45) Date of Patent: Nov. 26, 2024

(54) METHOD AND APPARATUS FOR AN AGGREGATED NETWORK

(71) Applicant: TP-LINK CORPORATION PTE. LTD., Singapore (SG)

(72) Inventors: Dongmei Huang, Shenzhen (CN); Canjie Chen, Shenzhen (CN)

(73) Assignee: TP-LINK CORPORATION PTE. LTD., Singapore (SG)

( * ) Notice: Subject to any disclaimer, the term of this patent is extended or adjusted under 35 U.S.C. 154(b) by 0 days.

(21) Appl. No.: 18/410,542

(22) Filed: Jan. 11, 2024

Related U.S. Application Data (63) Continuation of application No. 18/241,914, filed on Sep. 4, 2023, now abandoned.

(51) Int. Cl.
*H04W 40/12* (2009.01)
*H04W 40/24* (2009.01)

(52) U.S. Cl.
CPC ......... *H04W 40/12* (2013.01); *H04W 40/248* (2013.01)

(58) Field of Classification Search
CPC ........ G06F 21/316; G06F 21/32; G06F 21/36; G06F 3/0412; G06F 3/0416; G06F 3/04817; G06F 3/0488; G06F 3/04883; G06F 21/35; H04L 63/08; H04L 63/0861; H04L 63/104; H04L 9/3231; H04W 12/06; H04W 88/02; H04W 12/08; H04W 4/20; H04W 4/80; H04W 12/30; H04W 12/33; H04W 12/63; H04W 12/68
USPC .......................... 455/411; 726/16–19; 370/32
See application file for complete search history.

(56) References Cited

U.S. PATENT DOCUMENTS

| | | | |
|---|---|---|---|
| 8,711,855 B1* | 4/2014 | Murphy | H04L 12/28 370/254 |
| 2006/0274700 A1* | 12/2006 | Janneteau | H04L 45/04 370/338 |
| 2010/0091760 A1* | 4/2010 | Yoon | H04J 3/0658 370/350 |
| 2013/0051264 A1* | 2/2013 | Wang | H04W 76/16 370/252 |
| 2013/0083700 A1* | 4/2013 | Sindhu | H04L 41/044 370/255 |
| 2013/0281089 A1* | 10/2013 | Chandrasekhar | H04W 24/02 455/434 |

(Continued)

FOREIGN PATENT DOCUMENTS

| CN | 112492643 B | 2/2023 |
|---|---|---|
| CN | 115988671 A | 4/2023 |

(Continued)

*Primary Examiner* — Nathan S Taylor
(74) *Attorney, Agent, or Firm* — Loeb & Loeb LLP (57) ABSTRACT

The present disclosure provides method and apparatus for an aggregated network. A method for an aggregated network, for first node of the aggregated network, the method including: receiving a neighboring message(s) via physical links of the first node, wherein the received neighboring message includes aggregated networking information of a second node(s) that transmits the received neighboring message, and wherein the aggregated networking information includes at least one of wireless networking information and wired networking information of the second node(s); and performing at least one of wired networking or wireless networking with the second node based on the received neighboring message.

12 Claims, 4 Drawing Sheets

500

- 510: Determining first quality of each of backhaul links from the first node to primary node connected to the first node
- 520: For each of clients connected to the first node, calculating path quality of paths from the client to the primary node, based on the first quality of each of the backhaul links from the first node to the primary node and the second quality of the link from the client to the first node
- 530: For traffic from one of clients connected to the first node, based on the calculated path quality, selecting the optimal backhaul link among the backhaul links from the first node to the primary node as the selected backhaul link for the traffic (56) References Cited

U.S. PATENT DOCUMENTS

| | | | |
|---|---|---|---|
| 2014/0192708 A1* | 7/2014 | Wise | H04B 7/18513 |
| | | | 370/316 |
| 2014/0211615 A1* | 7/2014 | Murphy | H04L 43/10 |
| | | | 370/255 |
| 2015/0207677 A1* | 7/2015 | Choudhury | H04L 41/0895 |
| | | | 370/254 |
| 2018/0026839 A1* | 1/2018 | Hollinger | H04L 41/0806 |
| | | | 709/222 |
| 2018/0159954 A1* | 6/2018 | Lu | H04L 67/61 |
| 2020/0169796 A1* | 5/2020 | Winterrowd | H04Q 11/0071 |
| 2020/0267076 A1* | 8/2020 | Batardière | H04L 69/16 |

FOREIGN PATENT DOCUMENTS

| | | | | |
|---|---|---|---|---|
| EP | 2747354 A1 * | 6/2014 | | H04L 12/28 |
| EP | 2953301 A1 * | 12/2015 | | H04L 12/28 |
| EP | 2747355 B1 * | 2/2017 | | H04L 12/28 |

\* cited by examiner

┌─────────────────────────────────────────────────────────────┐
│ Determining first quality of each of backhaul links from the first node to │ ─ 510
│ primary node connected to the first node │
└─────────────────────────────────────────────────────────────┘
                              ↓
┌─────────────────────────────────────────────────────────────┐
│ For each of clients connected to the first node, calculating path quality of │
│ paths from the client to the primary node, based on the first quality of each │ ─ 520
│ of the backhaul links from the first node to the primary node and the second │
│ quality of the link from the client to the first node │
└─────────────────────────────────────────────────────────────┘
                              ↓
┌─────────────────────────────────────────────────────────────┐
│ For traffic from one of clients connected to the first node, based on the │
│ calculated path quality, selecting the optimal backhaul link among the │ ─ 530
│ backhaul links from the first node to the primary node as the selected │
│ backhaul link for the traffic │
└─────────────────────────────────────────────────────────────┘

METHOD AND APPARATUS FOR AN AGGREGATED NETWORK

CROSS-REFERENCE TO RELATED APPLICATION(S)

This application is a continuation of U.S. application Ser. No. 18/241,914, filed on Sep. 4, 2023 in the United States Patent and Trademark Office, the disclosure of which is incorporated by reference herein in its entirety.

TECHNICAL FIELD

The present disclosure relates to the field of communication, and more particularly to a method and apparatus for an aggregated network.

BACKGROUND

With the development of communication technology, a single network device can no longer meet the demand for wired or wireless network performance by users. It is desirable to utilize multiple network devices and perform networking with the multiple network device as nodes of the network.

Conventional networking mechanism comprises wireless networking and wired networking in the network, which both cannot leverage the bandwidth resources of the network devices, especially that of the high-end network devices. For example, the bandwidth of the wired or wireless links between networking nodes may be significantly lower than that required by the client.

In order to improve the utilization of the bandwidth resources of the communication system, the wired and wireless links are desirably both used in the same node in the network.

SUMMARY OF THE DISCLOSURE

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In order to overcome the defects in the prior art, the disclosure provides a method and apparatus for an aggregated network.

According to a first aspect of the disclosure, a method for an aggregated network is provided, applied to a first node of the aggregated network, the method comprising: receiving a neighboring message(s) via different physical links of the first node, wherein the received neighboring message comprises aggregated networking information of a second node(s) that transmits the received neighboring message, and wherein the aggregated networking information comprises at least one of wireless networking information and wired networking information of the second node(s); and performing at least one of wired networking or wireless networking with the second node based on the received neighboring message.

According to embodiments of the disclosure, the different physical links comprise different physical links utilizing the same communication protocol and different physical links utilizing different communication protocols; and the physical links comprise at least one of wired links and wireless links, wherein the wired links comprise Ethernet links and Power Line Communication (PLC) links and the wireless links comprise Wi-Fi links, Bluetooth links and Zigbee links.

According to embodiments of the disclosure, in case multiple neighboring messages comprising aggregated networking information are received, performing at least one of wired networking or wireless networking with the second node comprises: selecting the optimal node among the multiple second nodes that transmit the received neighboring message based on quality of the links between the second nodes and the first node; and performing at least one of wired networking or wireless networking with the determined optimal node.

According to embodiments of the disclosure, the method further comprises receiving a wireless packet(s) via wireless links of the first node, wherein information comprised in the received wireless packet comprises wireless networking information of a third node that transmits the received wireless packet; and the wireless networking comprises: in response to receiving the wireless networking information, initiating wireless networking with the third node.

According to embodiments of the disclosure, the second node and the third node refer to the same node.

According to embodiments of the disclosure, the aggregated networking information of the second node comprises role information indicating whether the second node is a primary node or a secondary node and band information indicating wired and wireless bands supported by the second node, and determining the optimal node among the second nodes that transmit the received neighboring message based on quality of the links between the second nodes and the first node comprises determining the optimal node to initiate the wired networking to maximize overall link bandwidth benefit in the aggregated network.

According to embodiments of the disclosure, the method further comprises at least one of: periodically broadcasting the wired neighboring message of the first node; and periodically transmitting the wireless packet comprising the wireless networking information of the first node to other nodes in the aggregated network.

According to embodiments of the disclosure, if multiple wireless packets are received via wireless links of the first node from multiple third nodes, initiating wireless networking to the third node comprises: determining one of the multiple third nodes as an optimal front node for the first node based on the wireless networking information of the multiple third nodes to have the best quality of wireless communication, and initiating the wireless networking to the optimal front node.

According to embodiments of the disclosure, the wireless networking information of each of the multiple third nodes comprises the network layer of the node, the number of band(s) of forward networking of the node, a sum of link bandwidths of forward networking for the node, the strength of forward signal(s) for the node, and Media Access Control (MAC) address of the node.

According to embodiments of the disclosure, the wired networking steps and the wireless networking steps are synchronously performed.

According to embodiments of the disclosure, if the first node supports Multi-Link Operation, the first node aggregates multiple wireless links of the first node as an aggregated wireless link before performing the method.

According to a second aspect of the disclosure, a method for an aggregated network is provided, the method applied to a first node of the aggregated network and comprising: determining first quality of each of backhaul links from the first node to a primary node connected to the first node; calculating path quality of paths from the client to the primary node, based on the first quality of each of the backhaul links from the first node to the primary node and second quality of the link from the client to the first node, wherein the path quality is calculated differently depending on the types of the backhaul links from the first node to the primary node and the link from the client to the first node; and for traffic from the client connected to the first node, based on the calculated path quality, selecting the optimal backhaul link among the backhaul links from the first node to the primary node as the selected backhaul link for the traffic.

According to embodiments of the disclosure, in case the client is a wireless client and the backhaul link is a wireless link: if the backhaul link utilizes the same band as the link from the client to the first node, the path quality is calculated as a function of the first quality and the second quality with consuming the utilization of channel taken into consideration, otherwise, the path quality is calculated as the smaller one of the first quality and the second quality; in case the client is a wireless client and the backhaul link is a wired link, or in case the client is a wired client and the backhaul link is a wireless link, the path quality is calculated as the smaller one of the first quality and the second quality.

According to embodiments of the disclosure, the function of the first quality and the second quality is a reciprocal of the sum of the reciprocals of the first quality and the second quality.

According to embodiments of the disclosure, the method further comprises, for the traffic from the client: determining whether the selected backhaul link is overloaded; and in case the selected backhaul is overloaded, based on the calculated path quality, reselecting the suboptimal backhaul among the backhaul links as the backhaul link for the traffic.

According to embodiments of the disclosure, the method further comprises, for traffic from the client: in case the selected optimal backhaul link for the traffic is a wireless link and utilizes the same band as the link from the client to the first node, based on the calculated path quality, reselecting the suboptimal backhaul among the backhaul links that utilizes different band from the client to the first node, as the backhaul link for the traffic.

According to embodiments of the disclosure, at least part of the traffic is steered to the reselected backhaul link in real time.

According to embodiments of the disclosure, the calculating of the path quality is performed periodically.

According to embodiments of the disclosure, the traffic is a stream from an application installed on the client.

According to a third aspect of the disclosure, a node in an aggregated network is provided, the first node comprises: a memory, and a processor communicatively coupled with the memory and configured to perform the method of the first aspect or the second aspect of the disclosure.

BRIEF DESCRIPTION OF THE DRAWINGS

The accompanying drawings are presented to aid in the description of various aspects of the disclosure and are provided solely for illustration of the aspects and not limitation thereof.

DESCRIPTION OF THE EMBODIMENTS

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Conventional wired-only networking mode and wireless-only networking mode in network devices cannot leverage the bandwidth resources of the network devices. To solve the problem, an aggregated network in which multiple different types of logical links exist can be utilized.

By way of example, and not limitation, such links in the aggregated network can comprise wired and wireless links in the aggregated network, different physical links utilizing the same communication protocols, different physical links utilizing different communication protocols, different logical links on the same physical links utilizing the same communication protocol or different communication protocols, and so on.

As used herein, the term "wired link" can refer to any data link physically implemented through a hard connection between devices such as the client and the network devices. By way of example, and not limitation, such wired links can comprise links in Ethernet, Power Line Communication (PLC), and so on. The aggregated network can comprise two aggregated Ethernet links, can comprise aggregated Ethernet link and PLC link, and so on.

The term "wireless link" can refer to any data link physically implemented through a wireless connection between devices such as the client and the network devices. By way of example, and not limitation, such wireless links can comprise Wi-Fi links, Bluetooth links, Zigbee links, and so on. Further, such wireless links can comprise wireless single-band link and wireless multi-band links.

The term "aggregated network" can refer to any network in which the devices are capable of communication through the wired links and the wireless links both, and wired communication and wireless communication can coexist at the same time. The aggregated network comprises at least some of the network devices that support communication through wired and wireless links both at the same time.

Nevertheless, it is not necessary for all the devices such as networking nodes or clients in the aggregated network to support the wired links and the wireless links both.

Figure 1:
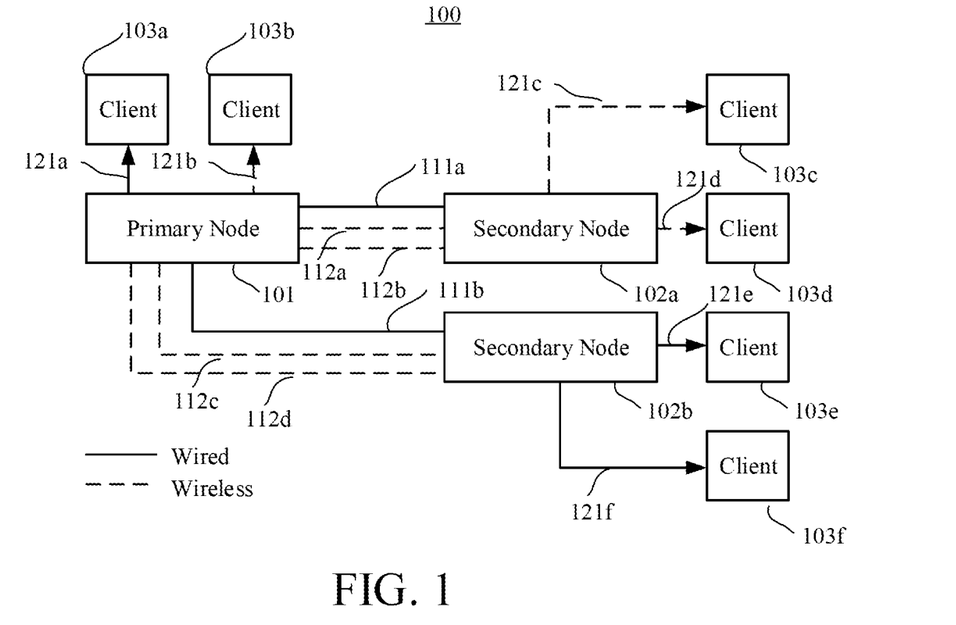
FIG. 1 illustrates an example structure of an aggregated network according to embodiments of the disclosure.

FIG. 1 illustrates an example structure of an aggregated network 100 according to embodiments of the disclosure.

As shown in FIG. 1, the aggregated network 100 can comprise a plurality of nodes comprising primary node 101 and secondary nodes 102a, 102b.

As used herein, the term "primary node" can refer to any master network devices that can be connected to the devices comprised in the aggregated network such as the secondary nodes and the clients. By way of example, and not limitation, such primary nodes can comprise Access Point (AP), such as Full Access Point (FAP), and Range Extender (RE) (for example, in case the RE is connected to another RE). For example, the primary node can be a gateway device.

The term "secondary node" can refer to any slave network devices that can be connected to the devices comprised in the aggregated network such as the primary node, the other secondary node, and the clients, and relay data from the primary node to the client and vice versa. By way of example, and not limitation, such a secondary node can comprise the RE. For example, the secondary nodes can be satellite devices.

It is to be understood by those skilled in the art that the aggregated network as described herein is not limited to comprising two different types of nodes, i.e., a primary node 101 and secondary nodes 102a, 102b as illustrated in FIG. 1. Rather, the aggregated network can comprise more or less types of nodes.

As shown in FIG. 1, wired links and wireless links can be established between the primary node 101 and the secondary nodes 102. For example, the primary node 101 can communicate with the secondary node 102a via any of wired link 111a or wireless links 112a or 112b, and can communicate with the secondary node 102b via any of wired link 111b or wireless links 112c or 112d. It is to be understood that the wired link and the wireless link can be supported between the primary node 101 and the secondary nodes 102 at the same time, and the primary node 101 and the secondary nodes 102 can communicate via any one, two, or more of the wired link and wireless links therebetween at the same time. Further, it is to be understood that although FIG. 1 illustrates one primary node 101 and two secondary nodes 102, and either of the secondary nodes 102 have one wired link 111a or 111b and two wireless links 112a, 112b or 112c, 112d with the primary node 101, the disclosure is not limited thereto. For example, the aggregated network 100 can comprise one, three, or more secondary nodes 102, and each secondary node 102 can have one, three, or more wireless links with the primary node 101 and two, three or more wired links with the primary node 101.

Further, wired links and wireless links can be established between the primary node 101 or the secondary nodes 102 and the clients 103a through 103f. As shown in FIG. 1, the client 103a can directly communicate with the primary node 101 via wired link 121a, and the client 103b can directly communicate with the primary node 101 via wireless link 121b, without the relaying of any of the secondary nodes 121. Also, the client 103c can directly communicate with the secondary node 102a via wireless link 121c, the client 103d can directly communicate with the secondary node 102a via wireless link 121d, the client 103e can directly communicate with the secondary node 102b via wired link 121e, and the client 103f can directly communicate with the secondary node 102b via wired link 121f. It is to be understood that the links mentioned here are merely exemplary, and the client can communicate with the primary node or the secondary nodes via other devices as a relay.

Conventional networking modes comprising wireless-only networking nodes and wired-only networking nodes do not support the coexistence of wired links and wireless links, which may result in a waste of bandwidth resources. For example, in the wireless-only networking mode, the performance of the wireless clients 103c and 103d connected to the secondary node 102a will be affected by the bandwidth of wireless links 112a or 112b between the primary node 101 and the secondary node 102a. Thus, the insufficient utilization of bandwidth of the wireless link 112a or 112b between the primary node 101 and the secondary node 102a will be detrimental to the wireless links 121c and 121d between the secondary node 102a and the clients 103c and 103d and cause waste of wireless resources. Similarly, in the wired-only networking mode, the performance of the wired clients 103e and 103f connected to the secondary node 102b will be affected by the bandwidth of the wired link 111b between the primary node 101 and the secondary node 102b. Thus, the insufficient utilization of bandwidth of the wired link 111b between the primary node 101 and the secondary node 102b will be detrimental to the wired links 121e and 121f between the secondary node 102b and the clients 103e and 103f and cause a waste of wired resources.

This disclosure is intended for performing aggregated networking mode to aggregate wired links and wireless links and performing link selection and load balancing of wired and wireless links for traffic from the clients in the aggregated networking mode. As described herein, the term "aggregated networking mode" can refer to a networking mode in which both wired networking and wireless networking are supported and thus wired links and wireless links can flexibly coexist, so as to improve network performance.

Figure 2:
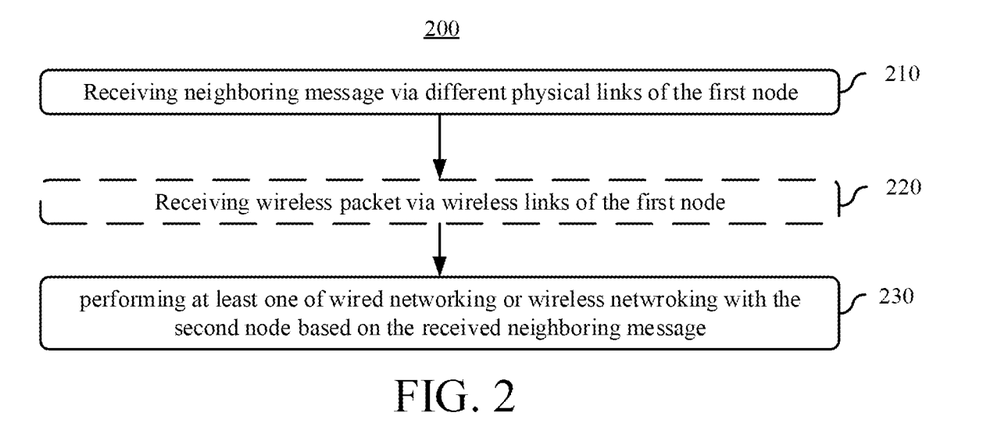
FIG. 2 is an example flow chart illustrating a method for the aggregated network according to embodiments of the disclosure.

FIG. 2 is an example flow chart illustrating method 200 for the aggregated network according to embodiments of the disclosure. Method 200 can be applied to a first node of the aggregated network. The first node can refer to any of the nodes of the aggregated network, especially to any of the secondary nodes.

According to embodiments of the disclosure, the first node can maintain aggregated networking information of the first node itself. As used herein, the term "aggregated networking information" can refer to information comprising at least one of wireless networking information and wired networking information of the first node. The aggregated networking information is maintained locally to the first node capable of participating in the networking. The information comprised in the aggregated networking information, such as the wired networking information and the wireless networking information, can be transmitted via wired and wireless links to another node of the aggregated networking information so that the node can perform networking, for example, determining the node to initiate wired networking or initiating wireless networking to the respective node, based on the received networking information of the first node.

Specifically, the aggregated networking information of the node in the aggregated network can comprise at least one of wireless networking information and wired networking information, and indicates any of the following: the level of the node in the aggregated network or the role that the node plays in the aggregated network, such as indicating the node is a primary node or a secondary node of the aggregated network, or indicating the node is a RE or a FAP of the aggregated network; the front link rate of the node; band(s)

that the node is able to utilize when performing networking with a front node for the node; signal strength of the node; and so on.

As shown in FIG. 2, in step 210, the first node can receive a neighboring message via different physical links of the first node. The received neighboring message can comprise aggregated networking information of a second node that transmits the received wired neighboring message. The second node can be any of the nodes of the aggregated network, comprising the primary nodes and the secondary nodes. Further, the second node can be any of the nodes of the aggregated network that are directly or indirectly connected to the first node.

Specifically, the neighboring message of the second node can comprise wired and wireless information, including any of the following information: role information indicating whether the second node is a primary node or a secondary node; band information indicating wired and wireless bands supported by the second node; information indicating the link rate of a wired interface of the node; information indication the receiving/transmitting (TX/RX) traffic of the wired interface of the node; and so on.

According to embodiments of the disclosure, the different physical links in step 210 can comprise different physical links utilizing the same communication protocol and different physical links utilizing different communication protocols. The physical links can comprise at least one of wired links and wireless links, in which the wired links can comprise Ethernet links, PLC links, and so on, and the wireless links can comprise Wi-Fi links, Bluetooth links, Zigbee links, and so on.

According to embodiments of the disclosure, the first node that receives a neighboring message can determine whether the second node that transmits the neighboring message supports aggregated networking based on whether the neighboring message comprises the information mentioned above. If the neighboring message does not comprise the information, which indicates that the second node that transmits the neighboring message cannot support aggregated networking, the first node can then skip the following steps of the method 200.

In step 220, the first node can receive wireless packets via the wireless links of the first node. The information elements (IEs) comprised in the received wireless packet can comprise information for identifying a third node that transmits the received wireless packet.

It is to be understood that the method 200 does not necessarily comprise step 220. In other words, the first node can perform wired networking and wireless networking based on the aggregated networking information received via physical links without receiving the IE comprised in the wireless packet. Also, the first node can perform wired networking and wireless networking based on the aggregated networking received via physical links and the IE comprised in the wireless packet both.

Specifically, the wireless networking information comprised in the IEs of the wireless packet can comprise information for identifying the third node and information indicating the performance of the third node.

In step 230, the first node can perform at least one of wired networking or wireless networking with the second node based on the received neighboring message. According to embodiments of the disclosure, the wired networking steps are performed between the first node and the second node that has a wired connection with the first node. For example, the wired connection according to embodiments of the disclosure can comprise any of the following connections: a direct connection between the first node and the second node, such as a direct connection between RE and FAP and a direct connection between two REs; and an indirect connection between the first node and the second node, such as an indirect connection between RE and FAP via a switch and an indirection connection between two REs via a switch; and so on.

According to embodiments of the disclosure, in case multiple neighboring messages comprising aggregated networking information are received, performing at least one of wired networking or wireless networking with the second node comprises: selecting the optimal node among the multiple second nodes that transmit the received neighboring message based on quality of the links between the second nodes and the first node; and performing at least one of wired networking or wireless networking with the determined optimal node.

Specifically, the wired networking steps can comprise: the first node, based on the aggregated networking information of the first node and the second node, determining the optimal node between the first node and the second node to initiate wired networking, and initiating wired networking if the second node is the optimal node. Otherwise, if it is determined that the first node itself is the optimal node, the first node can perform no further wired networking steps and wait for another node, such as the second node, to initiate wired networking.

According to embodiments of the disclosure, the aggregated networking information of the second node can comprise role information indicating whether the second node is a primary node or a secondary node and band information indicating wired and wireless bands supported by the second node, and determining the optimal node among the second nodes that transmit the received neighboring message based on quality of the links between the second nodes and the first node comprises determining the optimal node to initiate the wired networking to maximize overall link bandwidth benefit in the aggregated network.

According to embodiments of the disclosure, the method can further comprise receiving a wireless packet(s) via wireless links of the first node, wherein information comprised in the received wireless packet comprises wireless networking information of a third node that transmits the received wireless packet. The networking steps can comprise: in response to receiving the wireless networking information, initiating wireless networking with the third node. In particular, the third node is intended for the convenience of description, rather than for distinguishing from the second node(s) that transmits the neighboring message. Instead, the second node and the third node can refer to the same node, or to different nodes. Further, the first node can receive multiple wireless packets via links of the first node from multiple different third nodes. In this event, initiating wireless networking to the third node can comprise determining one of the multiple third nodes as an optimal front node for the first node based on the wireless networking information of the multiple third nodes to have the best quality of wireless communication and initiating the wireless networking to the optimal front node.

Specifically, the wireless networking information of each of the multiple third nodes can comprise any of the following information: information indicating the level of the node in the aggregated network or the role that the node plays in the aggregated network, such as indicating the node is a primary node or a secondary node of the aggregated network, or indicating the node is RE or FAP of the aggregated network; information indicating the number of band(s) that the node is able to utilize when performing networking with a front node for the node; information indicating the sum of link bandwidths of forward networking for the node; information indicating the strength of forward signal(s) for the node; and information indicating Media Access Control (MAC) address of the node; and so on.

Based on the wireless networking information, the first node can compare the performance of the multiple third nodes and select the optimal front node among the multiple third nodes. For example, the first node can select the third node with the lowest level in the aggregated network (in other words, the data packets have to be forwarded by the REs for the lowest times to be sent to the external network, for example, the data packets have to be forwarded for at least zero time if the third node is the FAP connected to the external network, have to be forwarded for at least one time if the third node is level-1 RE directly connected to the FAP, or have to be forwarded for at least two times if the third node is level-2 RE directly connected to another level-1 RE directly connected to the FAP, and so on), the third node able to utilize the most bands, the third node with the highest sum of link bandwidths of forward networking, the third node with the biggest MAC address, as the optimal front node.

FIG. 2 illustrates the method 200 comprising the steps 210-230, by way of example, not limitation. It is to be understood that the method 200 can comprise additional step(s), or omit one or more of the steps 210-230. Furthermore, two or more of steps 210-230 can be performed in parallel rather than in series.

According to embodiments of the disclosure, the method further comprises at least one of: periodically broadcasting the neighboring message of the first node; and periodically transmitting the wireless packet comprising the wireless networking information of the first node (for example, in information element of the wireless packet) to other nodes in the aggregated network. For example, a node of the aggregated network can broadcast the neighboring message upon the establishment of a wired connection between the node and another node in the aggregated network. Preferably, the steps of broadcasting the neighboring message and transmitting the wireless packet can be performed asynchronously or synchronously with any of the steps 210-240 of the method 200.

According to embodiments of the disclosure, the wired networking steps and the wireless networking steps are synchronously performed.

According to embodiments of the disclosure, the aggregated networking mode can be utilized in the aggregated network only if both the first and second nodes support it.

Figure 3:
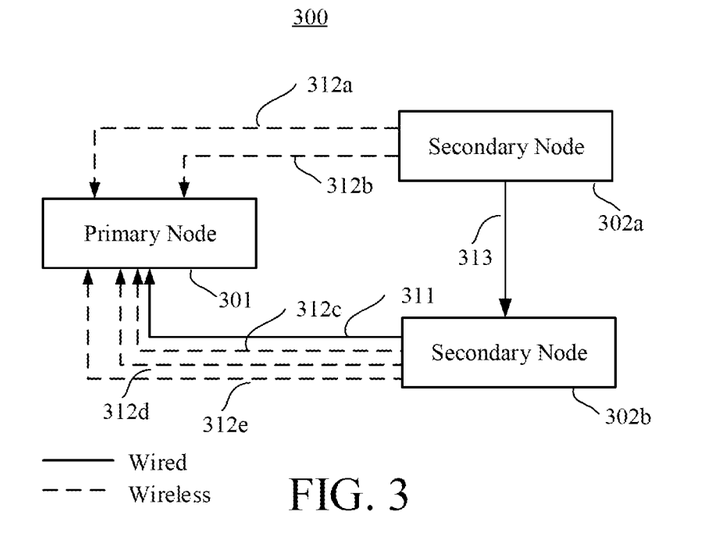
FIG. 3 illustrates a portion of an aggregated network according to embodiments of the disclosure.

FIG. 3 illustrates a portion of aggregated network 300 according to embodiments of the disclosure. The aggregated network 300 comprises a primary node 301 and secondary nodes 302a and 302b. 2G wireless link 312a and 5G wireless link 312b can be established between the primary node 301 and the secondary node 302a. Wired link 311, 2G wireless link 312c, 5G wireless link 312d, and 6G wireless link 312e can be established between the primary node 301 and the secondary node 302b. Wired link 313 can be established between the secondary nodes 302a and 302b.

In the aggregated network 300, upon establishment of a connection between the secondary nodes 302a and 302b, the secondary nodes 302a and 302b can respectively broadcast aggregated networking information of their own.

Upon receipt of the aggregated networking information from the secondary node 302b, the secondary node 302a can be informed that the secondary node 302b can connect to the primary node 301 via aggregated links comprising wired links and wireless links with three different bands. Thus, the secondary node 302a can determine that the secondary node 302b is the optimal node to initiate wired networking and wait for the secondary node 302b to initiate wired networking or initiate wired networking by itself, so that the bandwidth of links in the aggregated network will be maximized.

Also, upon receipt of the aggregated networking information from the secondary node 302a, the secondary node 302b can be informed that the secondary node 302a can connect to the primary node 301 via aggregated links comprising merely wireless links with two bands. Thus, the secondary node 302b can determine that itself is the optimal node to initiate wired networking, which may maximize the bandwidth of links in the overall aggregated network, and wait for the secondary node 302a to initiate wired networking or initiate wired networking by itself with the secondary node 302a to establish the wired connection 313.

Furthermore, for nodes that support Multi-Link Operation (MLO), the node can aggregate multiple wireless links of the node as an aggregated wireless link and then perform steps of the method 200, for example, performing transmission and receipt of the neighboring message and wireless packet and performing the wired networking steps and the wireless networking steps with other nodes in the aggregated network. MLO is a technology recently introduced in Wi-Fi Protocols that can aggregate multiple wireless links utilizing multiple different bands into an aggregated wireless link.

Figure 4:
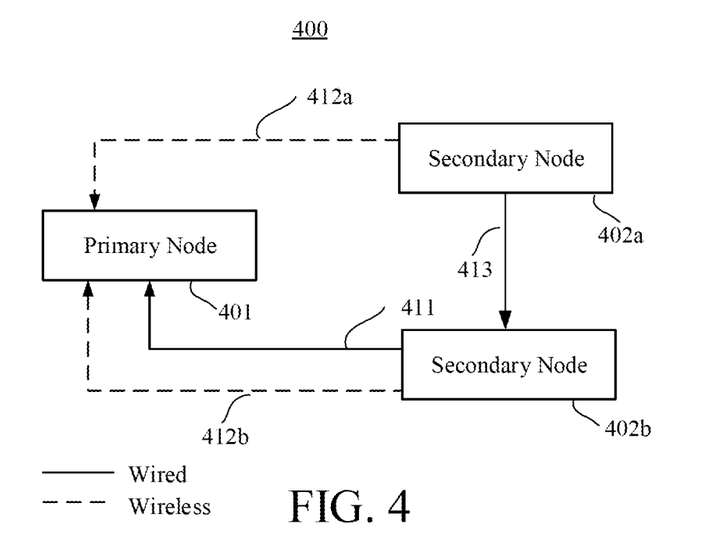
FIG. 4 illustrates a portion of an aggregated network according to embodiments of the disclosure, in which at least some nodes of the aggregated network support Multi-Link Operation.

FIG. 4 illustrates a portion of an aggregated network 400 according to embodiments of the disclosure, in which at least some nodes of the aggregated network support Multi-Link Operation.

As shown in FIG. 4, secondary nodes 402a and 402b support MLO. Before performing the aggregated networking method 200 discussed above, the secondary node 402a can aggregate multiple links (for example, 2G wireless link and 5G wireless link) as an aggregated wireless link 412a. Also, before performing the aggregated networking method discussed above, the secondary node 402b can aggregate multiple links (for example, 2G wireless link(s), 5G wireless link(s), and 6G wireless link(s)) as an aggregated wireless link 412b.

In the disclosure, to improve the performance of the links, a method for an aggregated network is further provided to select links among multiple available wireless and wired links and achieve load balancing over the links. According to embodiments of the disclosure, the wireless links can comprise wireless links each utilizing a single band, and wireless links each utilizing multiple bands (for example, aggregated wireless links, as shown in FIG. 4).

For an aggregated network, in which multiple backhaul links are provided between primary and secondary nodes, the transmission path for each of the clients connected to one of the secondary nodes can comprise a link between the client and the secondary node, a link between the secondary node and the primary node, a link between the primary node and the external network (such as the Internet), and so on. However, multiple links are generally provided between the primary node and the secondary node. Thus, the traffic from the client can be steered to a selected link among the multiple links between the primary node and the secondary node, for example, steered to the optimal link, to have the desired performance. Further, if the selected link is overloaded, at least part of the traffic can be steered to another link among the multiple links, for example to the suboptimal link.

As used herein, the term "traffic" can refer to a stream defined by a quintet from a client. For example, the traffic can come from an application installed on the client. Different applications on the same client can correspond to different streams (i.e., different traffics) from the client. The quintet can comprise, for example, the source IP address of the stream, the destination IP address of the stream, the source port number of the stream, the destination port number of the stream, and the transport protocol of the stream.

Figure 5:
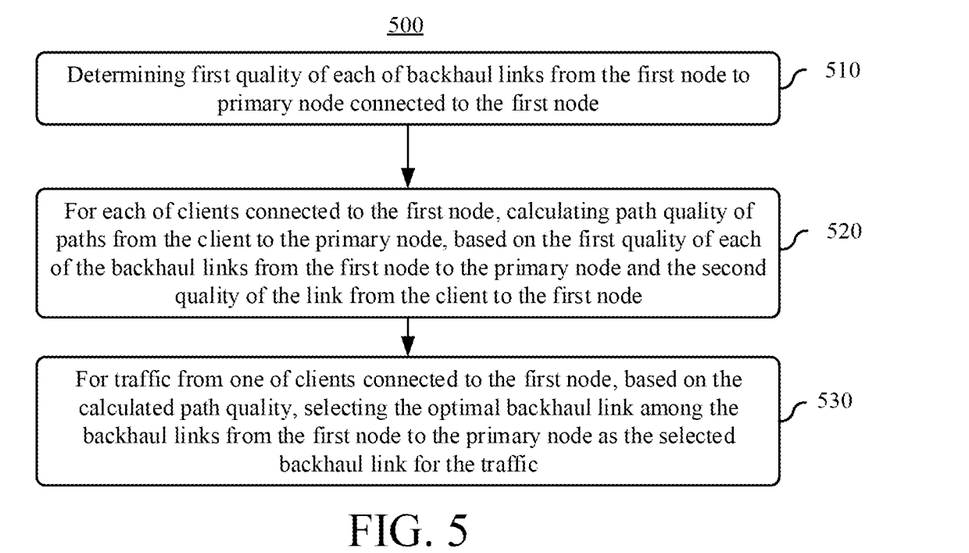
FIG. 5 is an example flow chart illustrating a method for the aggregated network according to embodiments of the disclosure.

FIG. 5 is an example flow chart illustrating method 500 for the aggregated network according to embodiments of the disclosure. The method 500 can be applied to a first node of the aggregated network. The first node can refer to any of the nodes of the aggregated network, especially to any of the secondary nodes.

As shown in FIG. 5, in step 510, the first node can determine the first quality of each of the backhaul links from the first node to a primary node connected to the first node. As used herein, the term "backhaul link" can refer to any link between primary and secondary nodes of the aggregated network. In particular, the first quality refers to the link quality of the backhaul links from the first node to the primary node directly connected to the first node.

Specifically, as used herein, the term "first quality" refers to the communication quality of the backhaul link from the secondary node to the primary node. The first quality can be dependent on any of the following: the link negotiation between the primary and secondary nodes, the strength of the signals between the primary and secondary nodes; load situation of links between the primary and secondary nodes, such as being overloaded or not overloaded; the idle situation of links between the primary and secondary nodes such as being busy or idle; types of links such as a wired link or wireless link; and so on.

In step 520, for the client connected to the first node, the first node can calculate path quality of paths from the client to the primary node, based on the first quality of each of the backhaul links from the first node to the primary node and second quality of the link from the client to the first node.

As used herein, the term "second quality" can refer to the communication quality of the link from the client to the first node. The second quality of the link from the wired client to the first node can be dependent on the link negotiation of the wired interface of the client, without any loss. The second quality of the link from a wireless client to the first node can be dependent on any of the following: the link negotiation of the wireless interface of the client; strength of the link between the client and the first node; and so on.

According to embodiments of the disclosure, the path quality is calculated differently depending on the types of the backhaul links from the first node to the primary node and the link from the client to the first node.

For example, in case the client is a wireless client and the backhaul link is wireless, the path quality can be calculated as shown in the following table:

Table 1

| The backhaul link utilizes the same band as the link from the client to the first node | path_quality = backhaul_quality * sta_quality/ (backhaul_quality + sta_quality) |
| --- | --- |
| The backhaul link utilizes a different band from the link from the client to the first node | path_quality = Min(backhaul_quality, sta_quality) |

In Table 1, "path_quality" refers to the quality of the path from the client to the primary node, "backhaul_quality" refers to the quality of the backhaul link from the first node to the primary node, and "sta_quality" refers to the quality of the link from client to the first node.

As shown in Table 1, if the backhaul link utilizes the same band as the link from the client to the first node, the path quality (i.e., "path_quality") can be calculated as a reciprocal of the sum of the reciprocals of the first quality (i.e., "backhaul_quality") and the second quality (i.e., "sta_quality"). For example, if the backhaul links from the first node to the primary node and the link from the client to the first node are both 2G wireless links, 5G wireless links, or 6G wireless links, the path quality can be calculated as a reciprocal of the sum of the reciprocals of the first quality and the second quality. This is mainly because the backhaul link from the secondary node to the primary node and the link from the client to the first node that both utilize the same band actually utilize the same channel resource, i.e., the air. It is to be understood that the above calculation of the path quality is merely exemplary, and any calculation as a function of the first quality and the second quality with consuming the utilization of channel taken into consideration can be applied to the disclosure.

Otherwise, if the backhaul link utilizes a different band from the link from the client to the first node, the path quality (i.e., "path_quality") can be calculated as the smaller one (i.e., "Min(backhaul_quality, sta_quality)") of the first quality (i.e., "backhaul_quality") and the second quality (i.e., "sta_quality"). For example, if the backhaul link from the first node to the primary node is a 6G wireless link while the link from the client to the first node is a 2G wireless link, the path quality can be calculated as the smaller one of the first quality and the second quality.

The calculation of the path quality as shown in Table 1 is merely an example calculation, and other calculations of the path quality with conflicts between the wireless links taken into consideration can also apply to the disclosure.

Further, if the client is a wireless client and the backhaul link is wired, or if the client is a wired client and the backhaul link is wireless, the path quality can be calculated as the smaller one (i.e., "Min(backhaul_quality, sta_quality)") of the first quality (i.e., "backhaul_quality") and the second quality (i.e., "sta_quality"). based on the first quality.

In other words, in the disclosure, the quality of wired links can be regarded as being lossless, and the quality of wireless links can be affected by multiple factors and thus regarded as being lossy.

According to embodiments of the disclosure, the calculation of the path quality is performed periodically. Based on the periodical calculation, the link selection and load balancing can be performed periodically or in real time.

In step 530, for traffic from the client connected to the first node, based on the calculated path quality, the first node can select the optimal backhaul link among the backhaul links from the first node to the primary node as the selected backhaul link for the traffic. The optimal backhaul link can be the backhaul link among the multiple available backhaul link that provides the best path quality.

According to embodiments of the disclosure, the optimal backhaul link can be selected merely as a candidate for the traffic. In other words, the transmission of the traffic is not necessarily performed over the optimal backhaul link. Other factors can be further taken into consideration, and the suboptimal backhaul link or other backhaul link can also be utilized in the transmission of the traffic.

For example, the method 500 further comprises, for the traffic from the client: determining whether the selected backhaul link is overloaded; and in case the selected backhaul is overloaded, based on the calculated path quality, reselecting the suboptimal backhaul among the backhaul links that utilize different band from the first node to the primary node, as the backhaul link for the traffic. The suboptimal backhaul link can be the backhaul link among the multiple available backhaul link that provides the second-best path quality. The reselecting can be performed before the transmission of the traffic. Also, the reselecting can be performed during the transmission of the traffic, so that at least part of the traffic is steered to the reselected backhaul link in real time.

For example, for traffic from the client: in case the selected optimal backhaul link for the traffic is wireless and utilizes the same band as the link from the client to the first node, based on the calculated path quality, reselecting the suboptimal backhaul link among the backhaul links as the backhaul link for the traffic.

Further, if the suboptimal link is also overloaded, the backhaul link that provides the third best path quality can be further reselected as the backhaul link for the traffic, and so on, until all the bandwidth source of all the available backhaul links are consumed.

Figure 6:
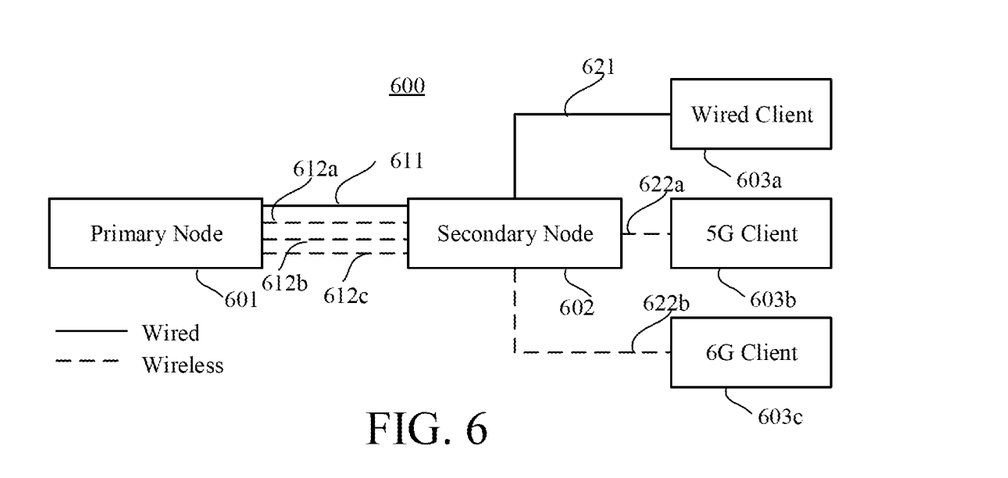
FIG. 6 illustrates an example structure of an aggregated network according to embodiments of the disclosure.

FIG. 6 illustrates an example structure of an aggregated network 600 according to embodiments of the disclosure.

As shown in FIG. 6, the aggregated network 600 can comprise primary node 601 and secondary node 602 connected to the clients. Wired client 603a, 5G wireless client 603b, and 6G client 603c can be connected to the secondary node 602. Available backhaul links from the secondary node 602 to the primary node 601 comprise the wired link 611, 2G wireless link 612a, 5G wireless link 612b, and 6G wireless link 612c.

For traffic from the wired client such as the wired client 603a as shown in FIG. 6, the paths from the wired client 603a to the primary node 601 comprise four paths as follows:
  a. the first path comprising the wired link 621 from the wired client 603a to the secondary node 602 and the wired link 611 from the secondary node 602 to the primary node 601;
  b. the second path comprising the wired link 621 from the wired client 603a to the secondary node 602 and the 2G wireless link 612a from the secondary node 602 to the primary node 601;
  c. the third path comprising the wired link 621 from the wired client 603a to the secondary node 602 and the 5G wireless link 612b from the secondary node 602 to the primary node 601; and
  d. the fourth path comprising the wired link 621 from the wired client 603a to the secondary node 602 and the 6G wireless link 612c from the secondary node 602 to the primary node 601.

Since the link from the wired client 603a to the secondary node 602 is wired and will not conflict with the wired or wireless backhaul link from the secondary node 602 to the primary node 601, the path quality of each of the four paths can be calculated as the smaller one of the first quality of the wired or wireless link from the secondary node 602 to the primary node 601 and the second quality of the wired link from the wired client 603a to the secondary node 602.

For traffic from the wireless client such as the 5G wireless client 603b as shown in FIG. 6, the paths from the 5G wireless client 603b to the primary node 601 comprise four paths as follows:
  a. the first path comprising the wireless link 622a from 5G wireless client 603b to the secondary node 602 and the wired link 611 from the secondary node 602 to the primary node 601;
  b. the second path comprising the wireless link 622a from 5G wireless client 603b to the secondary node 602 and the 2G wireless link 612a from the secondary node 602 to the primary node 601;
  c. the third path comprising the wireless link 622a from the 5G wireless client 603b to the secondary node 602 and the 5G wireless link 612b from the secondary node 602 to the primary node 601; and
  d. the fourth path comprising the wireless link 622a from the 5G wireless client 603b to the secondary node 602 and the 6G wireless link 612c from the secondary node 602 to the primary node 601.

Since the link from the 5G wireless client 603b to the secondary node 602 is a 5G wireless link and will not conflict with the wired link 611, the path quality of the first path can be calculated as the smaller one of the first quality of the wired link 611 and the second quality of the wireless link 622b from the 5G wireless client 603b to the secondary node 602.

As to the second path, since the link from the 5G wireless client 603b to the secondary node 602 is a 5G wireless link and utilizes a different band from the 2G wireless link 612a from the secondary node 602b to the primary node 601, the path quality of the second or third path can be calculated as the smaller one of the first quality of the 2G wireless link 612a from the secondary node 602b to the primary node 601 and the second quality of the link from the 5G wireless client 603b to the secondary node 602.

As to the third path, since the link from the 5G wireless client 602b to the secondary node 602 is a 5G wireless link and the backhaul link 612b from the secondary node 602 to the primary node 601 is also a 5G wireless link, which means both links share the same channel resource, the path quality of the third path can be calculated as a reciprocal of the sum of the reciprocals of the first quality of the 5G wireless link 612b and the second quality of the link from the 5G wireless client 603b to the secondary node 602.

As to the fourth path, since the link from the 5G wireless client 603b to the secondary node 602 is a 5G wireless link and utilizes a different band from the 6G wireless link 612c from the secondary node 602b to the primary node 601, the path quality of the second or third path can be calculated as the smaller one of the first quality of the 6G wireless link 612c from the secondary node 602b to the primary node 601 and the second quality of the link from the 5G wireless client 603b to the secondary node 602.

The above also applies to another wireless client, such as the 6G wireless client 603c.

Also, the above method is discussed with respect to wireless links that each utilize a single band. Nevertheless, it also applies to wireless MLO links as mentioned above.

Figure 7:
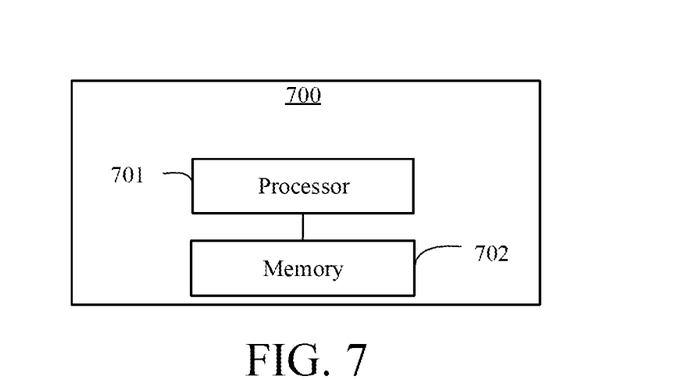
FIG. 7 is an example block diagram illustrating a node in the aggregated network according to embodiments of the disclosure.

FIG. 7 is an example block diagram illustrating node 700 in the aggregated network according to embodiments of the disclosure.

As shown in FIG. 7, the node 700 can comprise processor 701 and memory 702. The processor 701 is communicatively coupled with the memory and configured to perform the methods discussed above.

Examples of the processor 701 comprise microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

The processor 701 can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on memory 702.

The memory 702 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read-only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The memory 702 may reside in the processor 701, external to the processor 701, or distributed across multiple entities including the processor 701. The memory 702 may be embodied in a computer program product. By way of example, a computer program product may include a computer-readable medium in packaging materials. Those skilled in the art will recognize how to implement the described functionality presented throughout this disclosure depending on the particular application and the overall design constraints imposed on the overall system.

Figure 8:
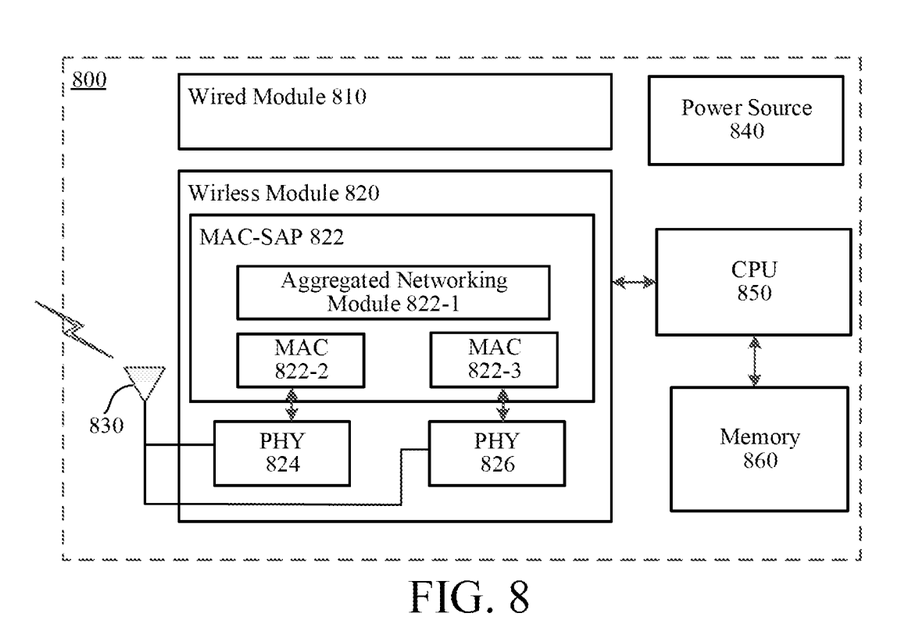
FIG. 8 is an example block diagram illustrating a node in the aggregated network according to embodiments of the disclosure.

FIG. 8 is an example block diagram illustrating a node in the aggregated network according to embodiments of the disclosure, for example, the first node that can be a FAP or a RE. The node 800 can include any of a wired module 810 and a wireless module 820. Further, the node 800 can include at least one antenna 830 (for the sake of simplicity, only one antenna is shown in FIG. 8), a power source 840, a central processing unit (CPU) 850, and at least one memory 860.

The Wireless module 820 may further comprise a MAC-SAP (service access point) 822 (i.e., the MAC sublayer) and PHY 824 and PHY 826 (collectively referred to as the PHY sublayer). The MAC-SAP 822 can comprise an aggregated networking module 822-1, MAC 822-2, and MAC 822-3. The MAC 822-2 and the PHY 824 can constitute an AP entity that can be used to establish a link and transmit/receive signal over a channel of the link via the antenna 830, and similarly, the MAC 822-3 and the PHY 826 can constitute anther AP entity, which can be used to establish another link and transmit/receive signal over a channel of another link via the antenna 830. The aggregated networking module 822-1 can be configured to obtain any of the aggregated networking information of the second node(s) derived from the neighboring messages (s) via different physical links of the node 800, and the aggregated networking information of the third node(s) derived from wireless packets via wireless links of the node 800, and to maintain the aggregated networking information of the first node itself. Further, the aggregated networking module 822-1 can be configured to perform at least one of wired networking or wireless networking with the second node based on the aggregated networking information, as described above in connection with FIG. 2 and FIG. 5, for example.

The Wireless module 820) and the CPU 850 may function together as a circuit (for example, as illustrated in FIG. 7) of the node 800 configured to perform methods (for example, as illustrated in FIG. 2 and FIG. 5) as described in the present disclosure.

It is to be understood that FIG. 8 illustrates the MAC-SAP of the node 800 comprising the MAC 822-2, the MAC 822-3, the PHY 824, and the PHY 826, the disclosure is not limited thereto. For example, the node 800 can comprise one, three, or more MAC and/or PHY modules.

The method and apparatus as disclosed in the specification can leverage the bandwidth resources of wired and wireless links and significantly improve the performance of network.

Expression such as "according to", "based on", "dependent on", and so on as used in the disclosure does not mean "according only to", "based only on", or "dependent only on", unless it is explicitly otherwise stated. In other words, such expression generally means "according at least to", "based at least on", or "dependent at least on" in the disclosure.

Any reference in the disclosure to an element using the designation "first", "second" and so forth is not intended to comprehensively limit the number or order of such elements. These expressions can be used in the disclosure as a convenient method for distinguishing two or more units. Thus, a reference to a first unit and a second unit does not imply that only two units can be employed or that the first unit must precede the second unit in some form.

The term "determining" used in the disclosure can include various operations. For example, regarding "determining", calculating, computing, processing, deriving, investigating, looking up (e.g., looking up in tables, databases, or other data structure), ascertaining, and so forth are regarded as "determination". In addition, regarding "determining", receiving (for example, receiving information), transmitting (for example, transmitting information), input, output, accessing (for example, access to data in the memory), and so forth, are also regarded as "determining". In addition, regarding "determining", resolving, selecting, choosing, establishing, comparing, and so forth can also be regarded as "determining". That is, regarding "determining", several actions can be regarded as "determining".

The terms such as "connected", "coupled" or any of their variants used in the disclosure refer to any connection or combination, direct or indirect, between two or more units, which can include the following situations: between two units that are "connected" or "coupled" with each other, there are one or more intermediate units. The coupling or connection between the units can be physical or logical, or can also be a combination of the two. As used in the disclosure, two units can be considered to be electrically connected through the use of one or more wires, cables, and/or printed, and as a number of non-limiting and non-exhaustive examples, and are "connected" or "coupled" with each other through the use of electromagnetic energy with wavelengths in a radio frequency region, the microwave region, and/or in the light (both visible and invisible) region, and so forth.

When used in the disclosure or the claims 'including", "comprising", and variations thereof, these terms are as open-ended as the term "having". Further, the term "or" used in the disclosure or in the claims is not an exclusive-or.

The present disclosure has been described in detail above, but it is obvious to those skilled in the art that the present disclosure is not limited to the embodiments described in the disclosure. The present disclosure can be implemented as a modified and changed form without departing from the spirit and scope of the present disclosure defined by the description of the claims. Therefore, the description in the disclosure is for illustration and does not have any limiting meaning to the present disclosure.

What is claimed is:

1. A method for an aggregated network, applied to a first node of the aggregated network, the method comprising:
    receiving one or more neighboring messages via multiple physical links of the first node comprising one or more wired links and one or more wireless links,
    wherein the one or more received neighboring messages comprises aggregated networking information of one or more second nodes that transmits the received neighboring messages, and wherein the aggregated networking information comprises at least one of wireless networking information and wired networking information of a respective second node; and
    performing at least one of wired networking or wireless networking with the one or more second nodes via the multiple physical links based on the wireless networking information and wired networking information included in the one or more received neighboring messages.

2. The method of claim 1, wherein:
    the multiple physical links comprise physical links utilizing the same communication protocol and physical links utilizing different communication protocols; and
    wherein the wired links comprise Ethernet links and Power Line Communication (PLC) links and the wireless links comprise Wi-Fi links, Bluetooth links and Zigbee links.

3. The method of claim 1, wherein in case multiple neighboring messages comprising aggregated networking information are received from multiple second nodes, performing at least one of wired networking or wireless networking with the one or more second nodes comprises:
    selecting an optimal node among the multiple second nodes that transmit the received neighboring messages based on quality of the links between the second nodes and the first node; and
    performing at least one of wired networking or wireless networking with the determined optimal node.

4. The method of claim 1, wherein:
    the method further comprises receiving one or more wireless packets via wireless links of the first node, wherein information comprised in the received wireless packet comprises wireless networking information of one or more third nodes that transmits the received wireless packets; and
    the wireless networking comprises: in response to receiving the wireless networking information, initiating wireless networking with one of the one ore more third nodes.

5. The method of claim 4, wherein the one or more second nodes and the one or more third nodes refer to a same set of nodes or different sets of nodes.

6. The method of claim 1, wherein:
    the aggregated networking information of the second node comprises role information indicating whether the second node is a primary node or a secondary node and band information indicating wired and wireless bands supported by the second node, and determining the optimal node among the second nodes that transmit the received neighboring messages based on quality of the links between the second nodes and the first node comprises determining the optimal node to initiate the wired networking to maximize overall link bandwidth benefit in the aggregated network.

7. The method of claim 1, further comprising at least one of:
    periodically broadcasting the neighboring message of the first node; and
    periodically transmitting the wireless packet comprising the wireless networking information of the first node to other nodes in the aggregated network.

8. The method of claim 4, wherein if multiple wireless packets are received via wireless links of the first node from multiple third nodes, initiating wireless networking to one of the multiple third nodes comprises:
    determining one of the multiple third nodes as an optimal front node for the first node based on the wireless networking information of the multiple third nodes to have the best quality of wireless communication, and
    initiating the wireless networking to the optimal front node.

9. The method of claim 8, wherein the wireless networking information of each of the multiple third nodes comprises network layer of the third node, number of bands of forward networking of the third node, sum of link bandwidths of forward networking for the third node, strength of forward signal(s) for the third node, and Media Access Control (MAC) address of the third node.

10. The method of claim 1, wherein the wired networking and the wireless networking are synchronously performed.

11. The method of claim 1, wherein if the first node supports Multi-Link Operation, the first node aggregates multiple wireless links of the first node as an aggregated wireless link before performing the method.

12. A node in an aggregated network, comprising:
    a memory, and
    a processor communicatively coupled with the memory and configured to perform the method applied to a first node of the aggregated network of claim 1.

* * * * *